W. S. GRAHAM.
PLANTER.
APPLICATION FILED JUNE 21, 1916.

1,255,005.

Patented Jan. 29, 1918.

INVENTOR
William S. Graham
By Adams & Jackson
Attorneys

UNITED STATES PATENT OFFICE.

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

PLANTER.

1,255,005. Specification of Letters Patent. Patented Jan. 29, 1918.

Application filed June 21, 1916. Serial No. 105,043.

*To all whom it may concern:*

Be it known that I, WILLIAM S. GRAHAM, a citizen of the United States, and a resident of Canton, in the county of Fulton, State of Illinois, have invented certain new and useful Improvements in Planters, of which the following is a specification, reference being had to the accompanying drawings.

My invention relates to planters and is designed particularly for use in a planter adapted to plant corn and some sort of leguminous product such as soy beans or cow peas. In recent years farmers have come to recognize the value to be derived from planting some leguminous product with a stand of corn, it having been clearly established that by this expedient the ultimate fertility of the soil is very materially increased, it being claimed by some that the yield of corn is increased even the first year. It has been found that the best results are obtained by planting the corn and the leguminous product at the same time and in the same hills, both crops being then harvested by the use of a binder, the peas or beans serving as a valuable addition for feeding purposes. It is the principal object of my invention to provide means by which the seed-dropping mechanism adapted for dropping the peas or the beans may be adjusted relative to the furrow-opener of the planter so as to insure the peas or beans being planted at the desired depth regardless of the depth at which the corn is planted. In the ordinary corn planter, a furrow from two to four inches deep is ordinarily opened up, the corn being dropped directly at the bottom of the furrow near the rear end of the furrow-opener at a point within the furrow which has not yet started to fill up. It is the object of my invention to provide for dropping the peas or beans at a variable distance in rear of the furrow opener so that such seed may be dropped at any point as desired at which the furrow has already filled up more or less completely, whereby the depth to which the peas or beans will be covered may be regulated. In the construction shown, this result is effected by providing an adjustable chute from the hopper adapted to contain the peas or beans, the lower end of the chute being adjustable backward and forward relative to the furrow-opener. The preferred means by which I have accomplished the said object are illustrated in the drawings and are hereinafter specifically described. That which I believe to be new and desire to cover by this application is set forth in the claims.

In the drawings.

Referring to the several figures of the drawings in which corresponding parts are indicated by the same reference characters,—

Figure 1:
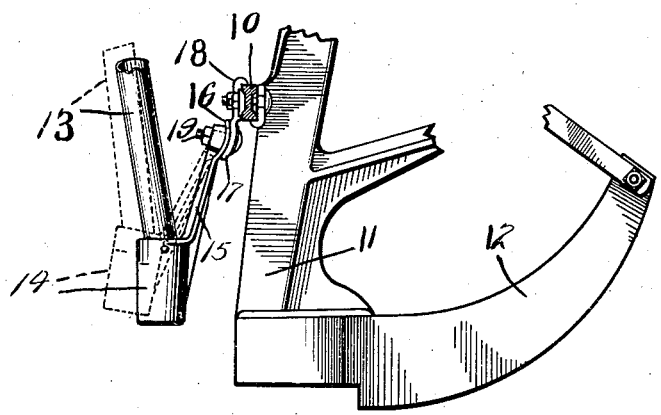
Figure 1 is a fragmentary view illustrating the adjustment of the lower end of the chute leading from the hopper adapted to contain the leguminous product.
Figure 2:
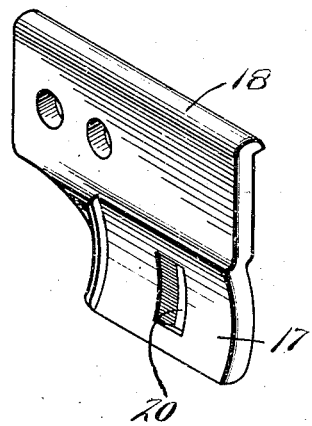
Fig. 2 is an enlarged detail illustrating one of the members by which the adjustment of the chute is effected.
Figure 3:
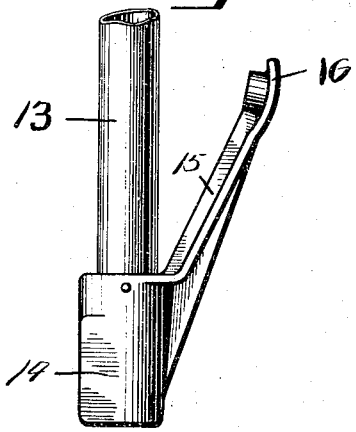
Fig. 3 is an enlarged detail illustrating the adjusting member adapted to coöperate with the member shown in Fig. 3.

10 indicates a cross-bar that forms one member of the furrow-opener frame of an ordinary corn planter. Upon the planter and supported in any usual manner are two hoppers (not shown), one for containing corn and the other for containing peas, beans, or any other product that it may be desired to plant in connection with the corn, as hereinbefore stated. Each of these hoppers will, of course, be provided with any suitable dropping mechanism. The corn after leaving its hopper will pass to the ground through the usual hollow shank 11 at the rear of the furrow-opener or runner 12, and the material from the other hopper will pass down through a chute 13 that is movably attached in place at its upper end as indicated by the dotted-line position in Fig. 1, and also, in the construction shown, through a sleeve 14 that is pivotally connected to the chute at the lower end thereof—the two parts 13 and 14 constituting in effect a single delivering device. The sleeve member 14 is attached to an arm 15 which is adapted to be adjusted angularly relative to said cross-bar 10 and relative to the furrow-opener 12 and locked in any adjusted position. The sleeve and the arm may advantageously be formed integral with each other as shown.

The adjustable mounting of the arm 15 is effected by means of an arc-shaped head 16 formed thereon engaging an arc-shaped head 17 carried by a bracket 18 secured to the cross-bar 10. The head 16 is held in position upon the head 17 by means of a bolt 19 which is adjustable relative to the head 17 by means of a slot 20. By adjusting the bolt 19 along the slot 20, and tightening the bolt in different positions along the slot, an angular adjustment of the arm 15 is readily affected as is illustrated in Fig. 1, serving to bring the lower end of the chute 13 and the lower end of the sleeve 14 to any desired distance from the rear end of the furrow-opener 12. As will be readily understood, upon an adjustment of the chute 13 rearwardly, the seed dropped through said chute will fall at a greater distance from the rear end of the runner and will consequently be covered at a less depth. By an adjustment of the chute 13 backward and forward, the depth of planting of the peas or beans can be regulated as desired.

It will, of course, be understood that each side of a planter will ordinarily be equipped with my improvements, and that the invention is applicable to various makes of planting machines.

What I claim as my invention and desire to secure by Letters Patent, is—

1. In a planter, the combination with a frame and a furrow-opener connected therewith, of a chute in rear of said furrow-opener, and means for adjustably securing said chute closer to or farther from said furrow-opener, said means comprising an arm connected with said chute and having an arc-shaped head, an arc-shaped member connected with the frame, and means for adjustably securing said head and member together.

2. In a planter, the combination with a frame and a furrow-opener connected therewith of a chute in rear of said furrow-opener, and means for adjustably securing said chute closer to or farther from said furrow-opener, said means comprising an arm connected with said chute and having an arc-shaped head, an arc-shaped member connected with the frame, one of said last-named parts being provided with a slot, and a bolt passing through said slot and through a suitable opening in the other part.

3. In a planter, the combination with a frame and a furrow-opener connected therewith, of a chute in rear of said furrow-opener, and means for adjustably securing said chute closer to or farther from said furrow-opener, said means comprising an arm connected with said chute and with a fixed member, said arm and member having complementary convex and concave surfaces in engagement with each other, and means for adjustably securing said engaging surfaces together to vary the distance between the furrow-opener and the discharge end of the chute.

WILLIAM S. GRAHAM.